US011187821B2

(12) United States Patent
Chaudhuri

(10) Patent No.: US 11,187,821 B2
(45) Date of Patent: Nov. 30, 2021

(54) INTEGRATION OF SEISMIC DRIVEN ROCK PROPERTY INTO A GEO-CELLULAR MODEL

(71) Applicant: Saudi Arabian Oil Company, Dhahran (SA)

(72) Inventor: Debasis Chaudhuri, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 314 days.

(21) Appl. No.: 16/255,587

(22) Filed: Jan. 23, 2019

(65) Prior Publication Data

US 2020/0233110 A1 Jul. 23, 2020

(51) Int. Cl.
*G01V 1/30* (2006.01)

(52) U.S. Cl.
CPC ...... *G01V 1/306* (2013.01); *G01V 2210/6244* (2013.01)

(58) Field of Classification Search
CPC .......... G01V 1/306; G01V 2210/6244; G01V 2210/6652; G01V 99/005; G01V 1/30; G01V 2210/62; G01V 2210/624; G01V 2210/66; G01V 2210/665
See application file for complete search history.

(56) References Cited

U.S. PATENT DOCUMENTS

| | | |
|---|---|---|
| 9,702,996 B2 | 7/2017 | Goggin |
| 9,880,321 B2 | 1/2018 | Ramsay |
| 2002/0042702 A1 | 4/2002 | Calvert et al. |
| 2012/0221306 A1 | 8/2012 | Hurley |
| 2015/0316682 A1 | 11/2015 | Yams |
| 2016/0245950 A1 | 8/2016 | Ramsay |

(Continued)

FOREIGN PATENT DOCUMENTS

WO 2018229469 12/2018

OTHER PUBLICATIONS

Xu et al., "Integrating Seismic Data in Reservoir Modeling: The Collocated Cokriging Alternative", 67th Annual Technical Conference and Exhibition of the Society of Petroleum Engineers held in Washington, DC. Oct. 4-7, 1992 (Year: 1992).*

(Continued)

*Primary Examiner* — Regis J Betsch
(74) *Attorney, Agent, or Firm* — Fish & Richardson P.C.

(57) ABSTRACT

Methods, systems, and apparatus, including computer programs encoded on a computer storage medium, to generate generating geo-cellular models with improved lacunae. In one aspect, a method includes receiving a seismic dataset of a surveyed subsurface, and the seismic dataset includes seismic porosities in depth of the surveyed subsurface. Seismic porosities resampled into a three dimensional (3D) geological fine layer model grid. Seismic porosities at well locations are extracted using the 3D geological fine layer model grid. Log porosities and the seismic porosities are upscaled into coarse layers, and the coarse layers are identical for all the well locations. Match factors are determined based on differences between the upscaled log porosities and the downscaled seismic porosities. Co-krig the log porosities are correlated with the 3D geological fine layer model grid using the match factors as a soft constraint to produce a final 3D model.

18 Claims, 15 Drawing Sheets

(56) References Cited

U.S. PATENT DOCUMENTS

2017/0357739 A1 12/2017 Bouaouaja et al.
2018/0017691 A1 1/2018 Dirksen et al.

OTHER PUBLICATIONS

Godwill et al., "Application of 3D Reservoir Modeling on Zao 21 Oil Block of Zilaitun Oil Field", J Pet Environ Biotechnol 2016 (Year: 2016).*
Pandey et al., "Geocellular Modeling of Manhera Tibba Gas Field, Jaisalmer Basin, Rajasthan", Search and Discovery Article #20456 (2019)** Posted Mar. 18, 2019 (Year: 2019).*
Moon et al., "Collocated cokriging and neural-network multi-attribute transform in the prediction of effective porosity: A comparative case study for the Second Wall Creek Sand of the Teapot Dome field, Wyoming, USA", Journal of Applied Geophysics 131 (2016) 69-83 (Year: 2016).*
Moon et al., "Collocated cokringing and neural-network multi-attribute transform in the prediction of effective porosity: A comparative case study for the second wall creek sand of the teapot dome field, Wyoming, USA," Journal of Applied Geophysics, 2016, 131(24): 69-83.
Saputro et al., "3D geomechanical modeling driven by acoustic impedance and seismic velocity: A case study of carbonate reservoir, East Java Basin," AIP Conference Proceedings, Oct. 2018, pp. 1-4.
PCT International Search Report and Written Opinion in International Appln. No. PCT/US2020/014463, dated May 6, 2020, 16 pages.
GCC Examination Report in GCC Appln. No. GC 2020-39048, dated May 23, 2021, 4 pages.

* cited by examiner

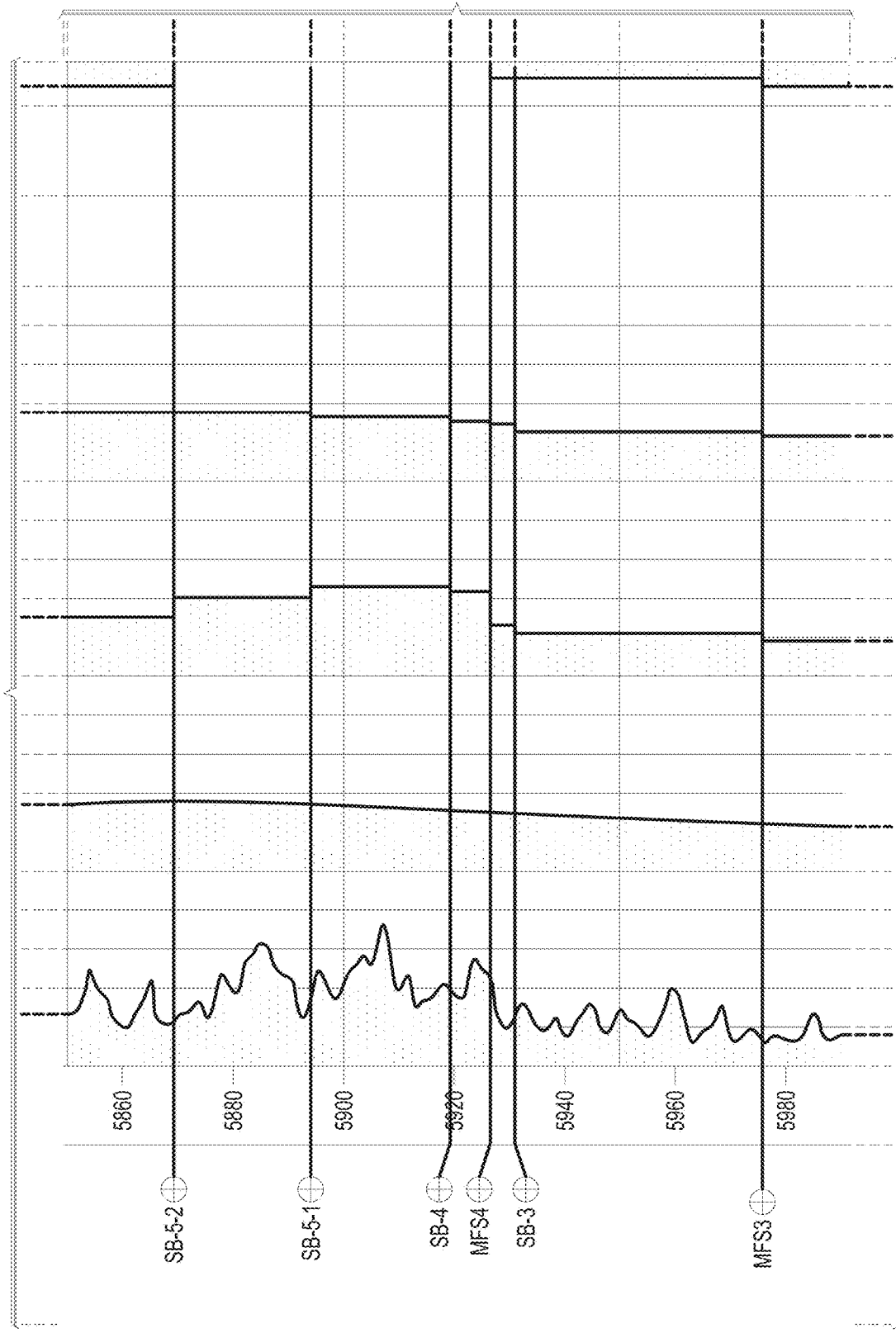

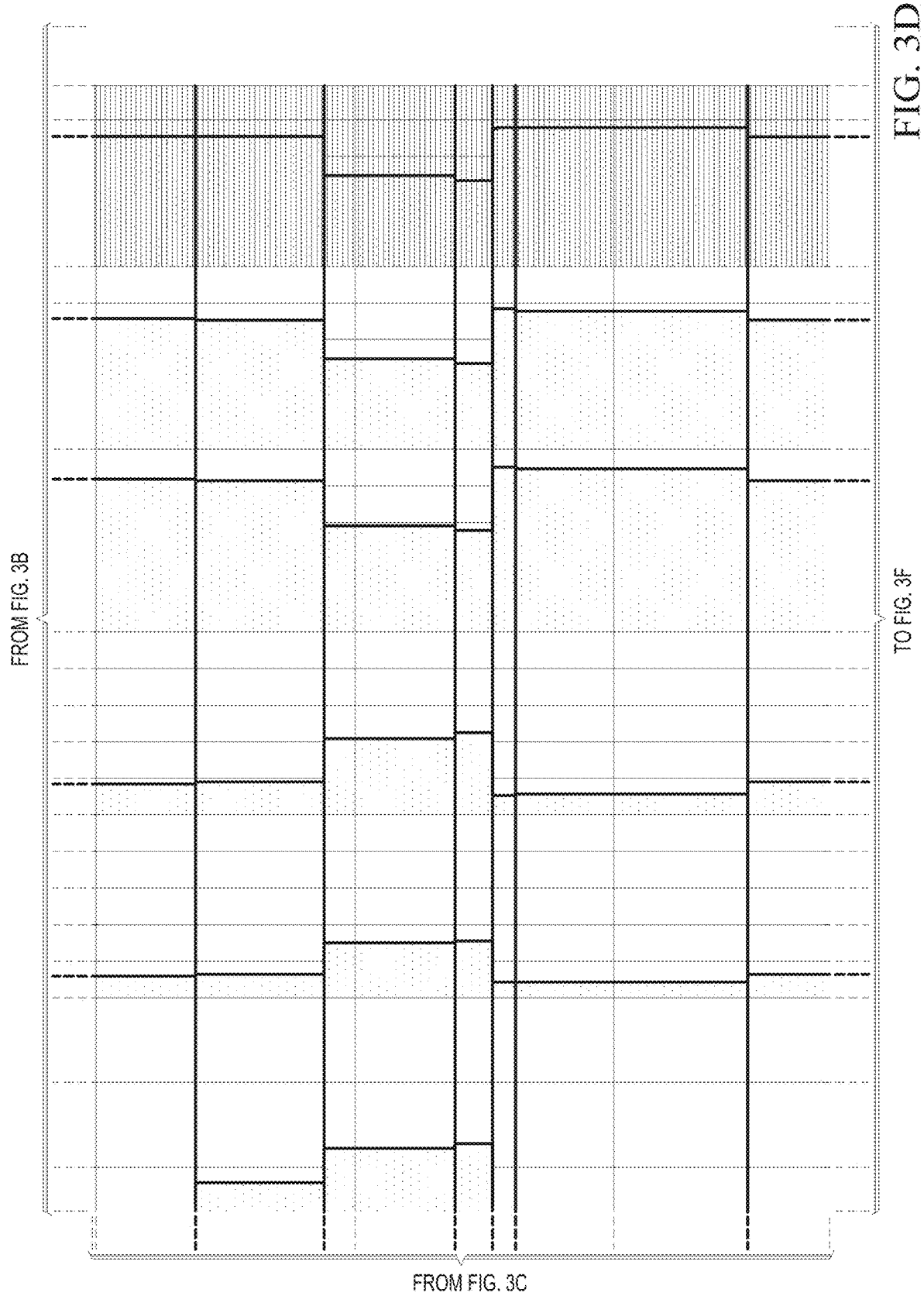

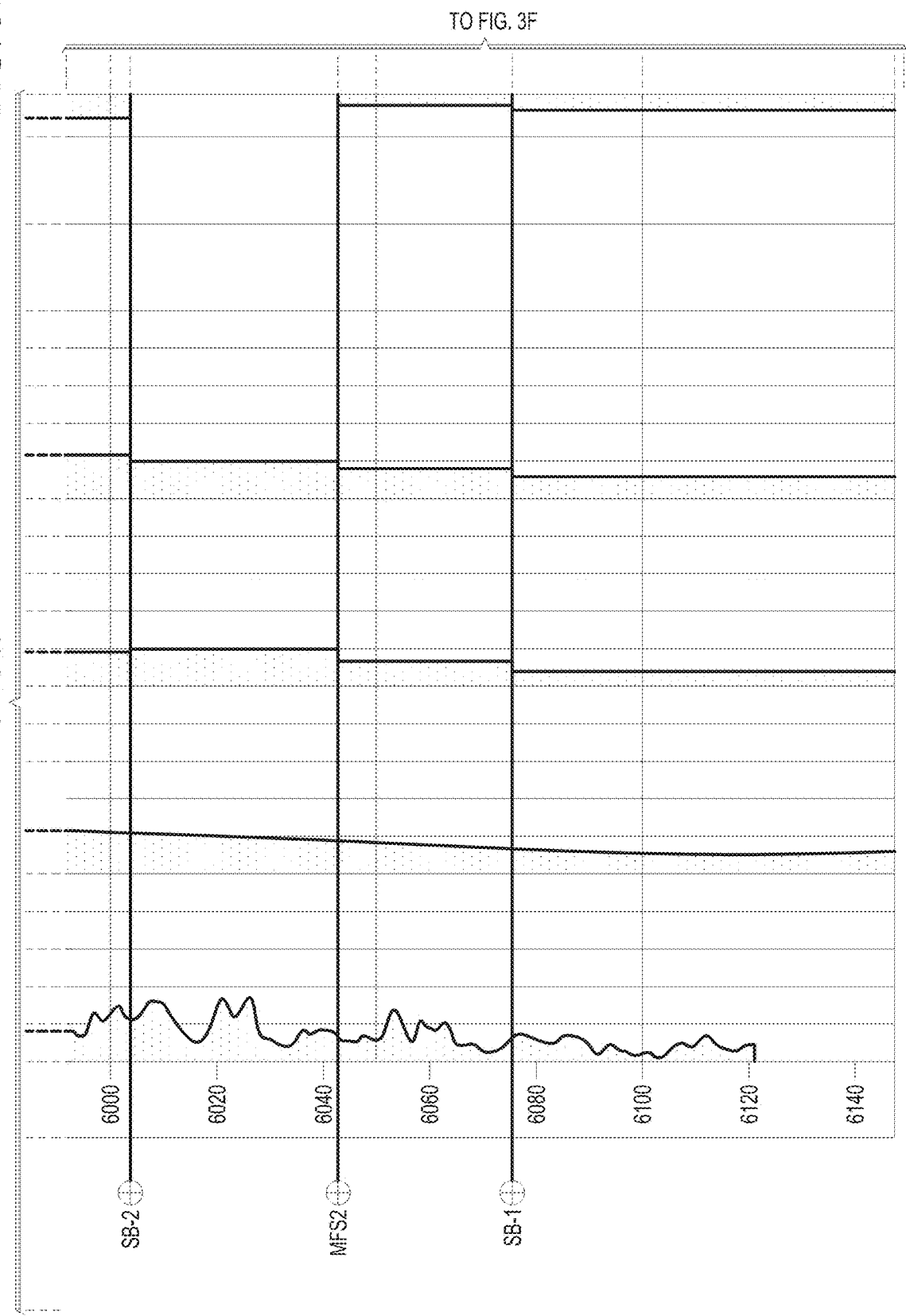

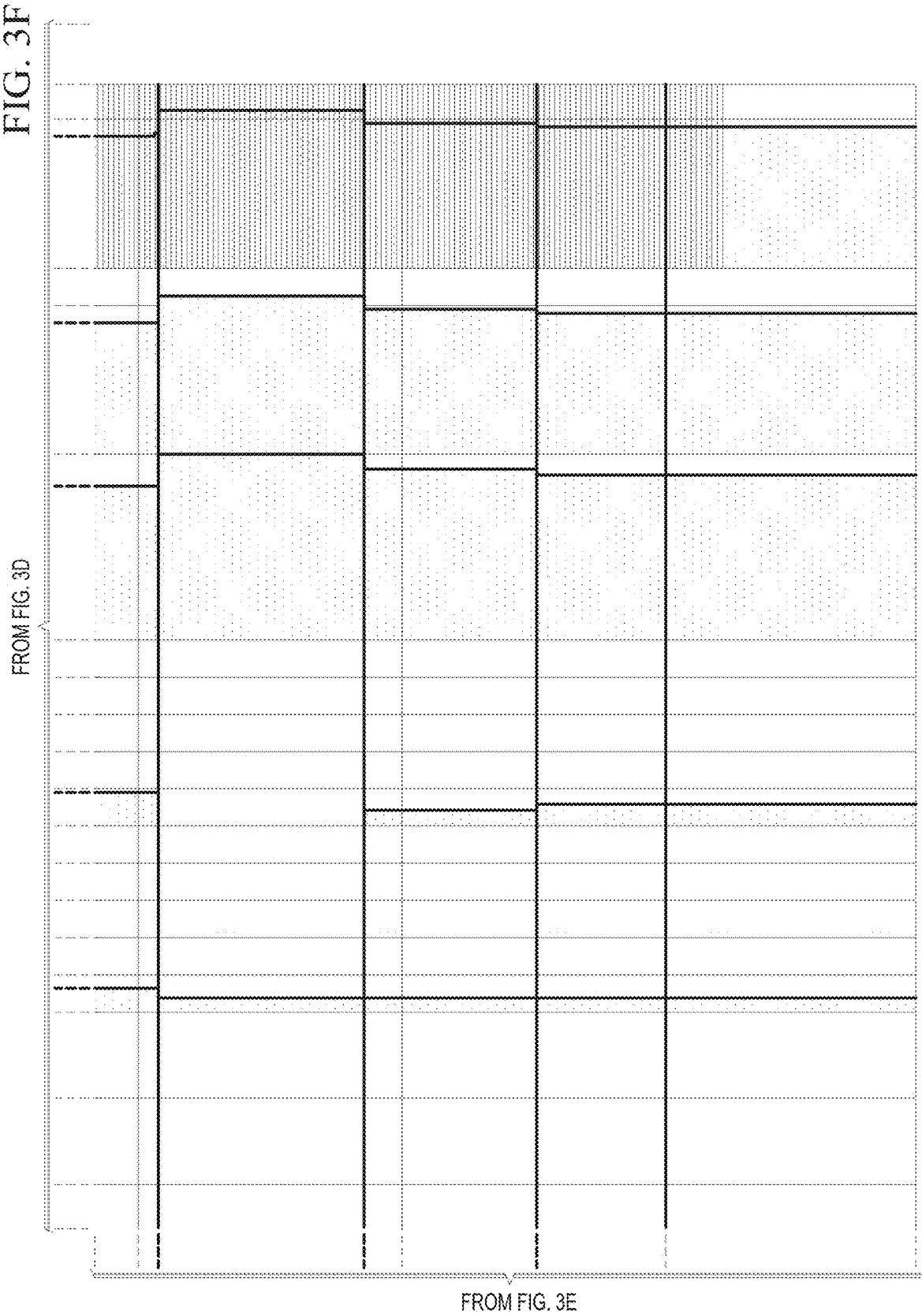

3D MODEL WITH WELL LOGS ONLY

SEISMIC POROSITY IN 3D MODEL

MATCH FACTOR IN 3D MODEL

FINAL GEOLOGICAL MODEL

MODEL LAYER FROM
LOG ONLY 3D MODEL

MODEL LAYER FROM SEISMIC AND
WELL LOG DATA

INTEGRATION OF SEISMIC DRIVEN ROCK PROPERTY INTO A GEO-CELLULAR MODEL

TECHNICAL FIELD

This disclosure relates to methods, systems, and apparatus for improving the exploration for hydrocarbons.

BACKGROUND

Hydrocarbons, such as oil and gas, occur in the Earth's subsurface at a depth ranging from a few hundred meters to several kilometers and are found in geological formations, which are layers of rock. As such, prospecting for hydrocarbons includes the difficult tasks of identification of where such geological formations exist and extraction of the hydrocarbons from these geological formations at such depths. Identifying the location of hydrocarbons may include the conducting of geological surveys collected through, for example, seismic prospecting. These geological surveys can be employed to construct geological maps representing the structure of areas of the outer crust of the Earth.

SUMMARY

Implementations of the present disclosure are generally directed to a system generating geo-cellular models with improved reliability. The described system improves geo-cellular models by comparing well logs data and seismic data in scaled up compartments that conform to model grids in a one dimensional (1D) mode where a correlation log may be created at every well location. These correlation logs may be employed to generate a correlation model having the same dimension as a geological model.

Methods, systems, and apparatus, including computer programs encoded on a computer storage medium, to generate generating geo-cellular models with improved predictability. In one aspect, a method includes receiving a seismic dataset of a surveyed subsurface, and the seismic dataset includes seismic porosities in depth of the surveyed subsurface. Seismic porosities resampled into a three dimensional (3D) geological fine layer model grid. Seismic porosities at well locations are extracted using the 3D geological fine layer model grid. Log porosities and the seismic porosities are upscaled into coarse layers, and the coarse layers are identical for all the well locations. Match factors are determined based on differences between the upscaled log porosities and the downscaled seismic porosities. Colocated cokrig the log porosities with the 3D geological fine layer model grid using the match factors as a soft constraint to produce a final 3D model.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIGS. 3A-F is an example of a complete sequential buildup of the workflow.

DETAILED DESCRIPTION

Figure 1A:
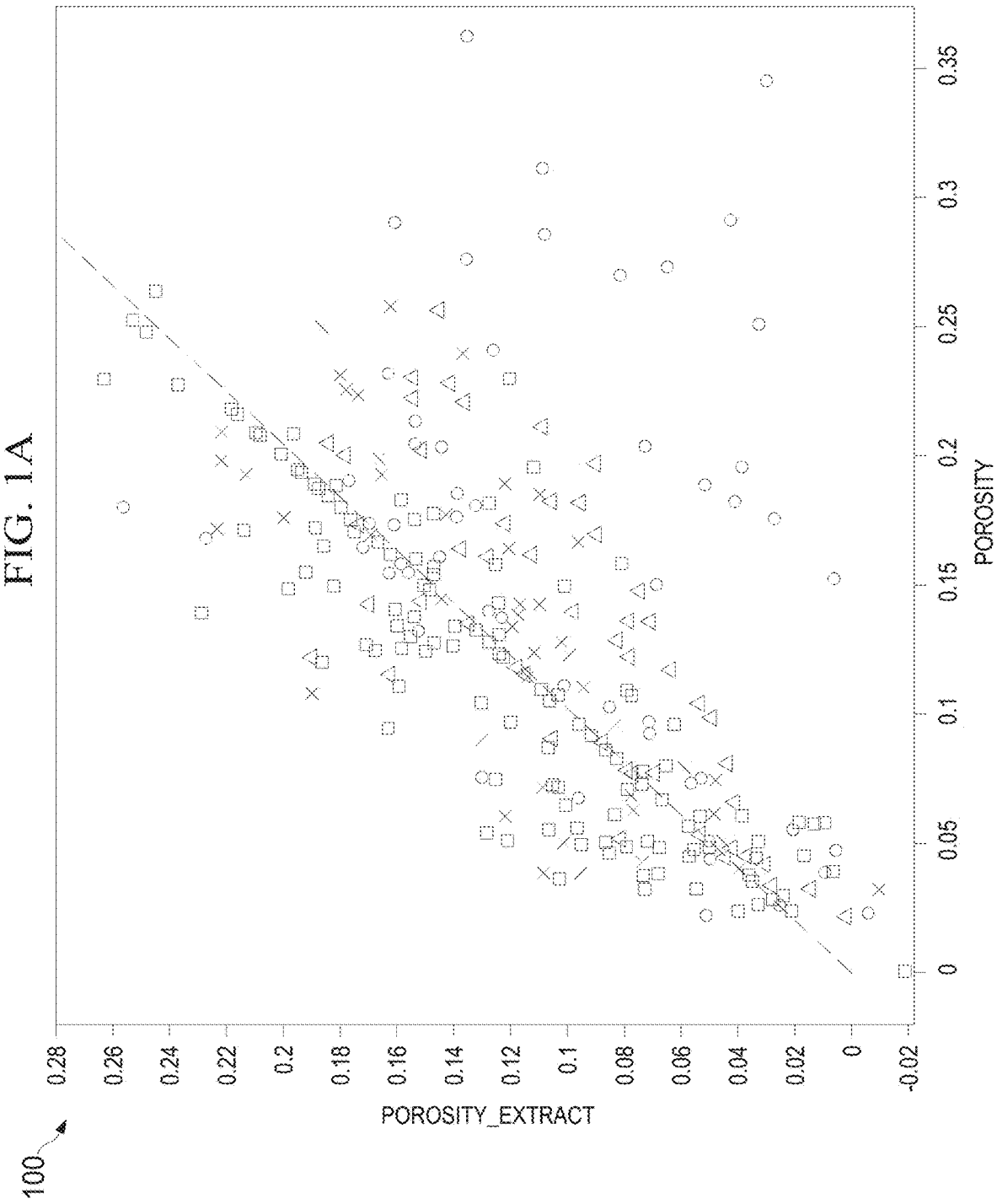
FIGS. 1A-B illustrate example well log-seismic porosity cross plots.

This disclosure generally describes a system to generate geo-cellular models with improved predictability. The disclosure is presented to enable any person skilled in the art to make and use the disclosed subject matter in the context of one or more particular implementations. Various modifications to the disclosed implementations will be readily apparent to those skilled in the art, and the general principles defined in this application may be applied to other implementations and applications without departing from scope of the disclosure. Thus, the present disclosure is not intended to be limited to the described or illustrated implementations, but is to be accorded the widest scope consistent with the principles and features disclosed in this application.

To extract the contained hydrocarbons, a respective geological formation has to have sufficient porosity and permeability to be productive. Porosity includes the fraction of the bulk volume of rock that is not rock (e.g., the spaces in between grains). Porosity may range from a few percent to more than 30 percent. Hydrocarbon formations may also contain water in the pore spaces, which may or may not flow along with the hydrocarbon. Permeability includes a measure of how easily fluids flow through a porous rock, which may vary dramatically by layer. Geological models, for example, can be employed to capture the spatial variability in porosity, permeability, and water and hydrocarbon saturations.

Moreover, geological layers and formations may exhibit even more complexity in the subsurface than they do at the surface. These formation may include, for example, meandering river channels and streams, carbonate reefs, beaches, dunes and the jumbled mix of sands and shales that characterize turbidities. Additionally, complex faults, salt domes and other features further complicate the subterranean environment.

Seismic surveys, well logs, cores, and so forth may be employed to generate 3D models that map subsurface formations. For example, a geo-cellular model may use grids to construct a static model of a reservoir. These grids may include information regarding the petrophysical, geological, geophysical, fluid, and rock depicted as spatially distributed throughout the respective reservoir. For example, a geo-cellular model may include a vertical cell size of one to two feet. Such a model can be constructed by kriging the well logs into the space using a deterministic or a stochastic approach. Kriging comprises a method of interpolation for which the interpolated values are modeled by a Gaussian process governed by prior covariances, as opposed to a piecewise-polynomial spline chosen to optimize smoothness of the fitted values. In some implementations, seismic driven rock property (e.g., porosity) can be integrated into a geo-cellular model as seismic driven rock properties have more spatial coverage as compared to wells. A correlation can be made between the integrated seismic property and a log property. Such log properties may be obtained via well logging, also known as wireline logging. Well logging includes the collection of data (log properties) in the borehole environment. The collected log properties may enable, for example, the determination of subsurface physical properties and reservoir parameters. In general, well logs respond to variations in rock matrix and pore fluid composition. An example correlation made between the integrated seismic property and a log property, may include determining a correlation value to weight the seismic property as a soft constraint in the geo-cellular model. In some implementations, such a model may include large imperfections (e.g., a positive correlation where, in some layers, the properties correlate negatively) as the resolutions of seismic properties and well log are not the same. Thus comparing these data points directly can results in poor correlation.

Geo-cellular models may be input to a dynamic model, which can be employed for reservoir simulations. For example, in a reservoir simulator, fluid flow and material balance equations may be solved for each of the grids within the geo-cellular model to predict reservoir behavior under various alternatives.

Seismic data integration into a geologic model is fraught with lacunae due to large dissimilarity in log and seismic scales. Seismic property does not have the vertical resolution of a geological model and a geological model does not have the seismic heterogeneity. This workflow brings in a concept where seismic property can be integrated with a 3D weight which is varying both spatially and temporally.

In view of the forgoing, the described system includes a methodology to improve reliability in generated geo-cellular models. In some implementation, the described system improves geo-cellular models by comparing well logs data and seismic data in scaled up compartments that conform to model grids in a one dimensional (1D) mode where a correlation log may be created at every well location. These correlation logs may be employed to generate a correlation model having the same dimension as a geological model. Seismic data can be weighed in as a soft constraint with the generated correlation model as a 3D property in a collocated cokriging of the well data. The resulting geo-cellular model not only faithfully incorporates the seismic data with its variability, but also gives better correlation while validating with the blind wells. Blind wells, for example, are wells that are not used in model building as they may be kept separate to test the predictability of a model.

In some implementations, a seismic property cube in depth may be in a different scale than a geo-cellular model. For example, a typical Seismic scale may be around 40 feet whereas a geo-cellular model scale may be between one to two feet. As such, these two properties may not be able to be directly compared. The integration of seismic data into a model may include establishing a correlation coefficient between log data and seismic data. This correlation coefficient may be in either model scale or seismic scale. In some implementations, the seismic scale provides a better correlation than model scale. The integration of seismic data into a model may include cokrig the well logs with the seismic property as soft constraints with the correlation coefficient as the weight. For example, traditional regression methods may only use data available at a target location and fail to use existing spatial correlations from secondary-data control points and the primary attribute to be estimated.

Cokriging methods can be employed to take advantage of the covariance between two or more regionalized variables that are related, and can be appropriate when the main attribute of interest (well data) is sparse, but related secondary information (seismic) is abundant. Cokriging is a geostatistical technique that can be used for interpolation (mapping and contouring) purposes. In some implementations, cokriging is a generalized form of a multivariate linear regression model, for estimation at a point, over an area, or within a volume. The technique may include linear-weighted averaging methods, similar to other interpolation methods; however, the weights may depend not only on distance, but also on the direction and orientation of neighboring data to an unsampled location.

Geostatistical-data-integration methods yield more-reliable reservoir models because they capitalize on the strengths of both data types. This integration of seismic data into a model may suffer from several drawbacks. For example, correlation from point observations is constant throughout the model space, the correlation is not valid in many parts of the model space, and establishing the correlation is doubtful as the comparison is not an "apple-to-apple" comparison.

Figure 1B:
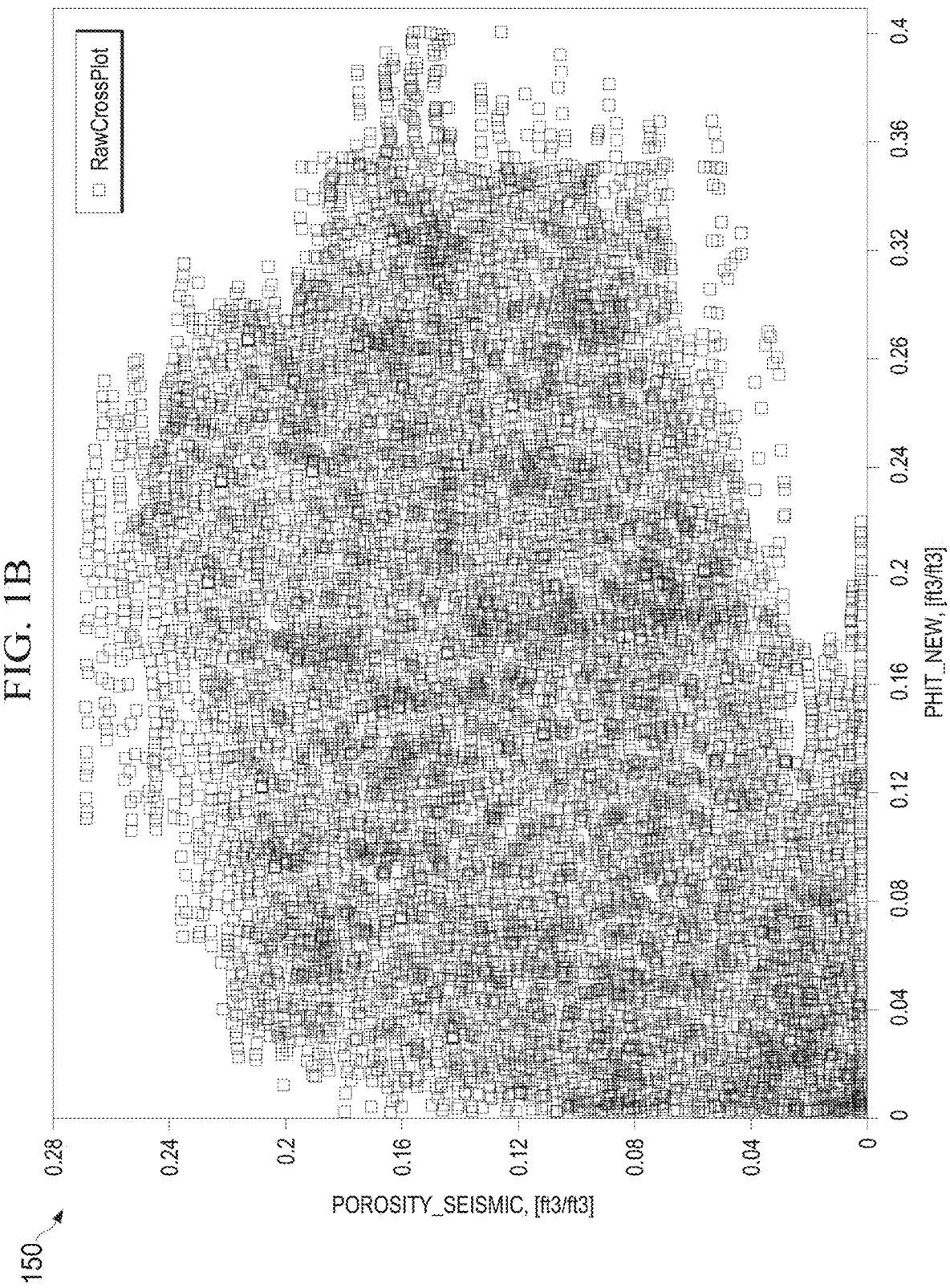

FIG. 1A depicts an example well log-seismic porosity cross plot sampling 100 at four milliseconds (ms). FIG. 1B depicts an example well log-seismic porosity cross plot 150 at a sampling of one foot (Geological model scale). Traditional ways of incorporation seismic data includes a regression analysis of seismic and well data to determine the correlation coefficient, which can be determined either in the seismic scale as depicted in FIG. 1A or model scale as depicted in FIG. 1B. Both of these may not be correct as a large correlation coefficient arrived at from FIG. 1A is not valid at the model scale and a small correlation coefficient from FIG. 1B is incorrect as variables of different scales cannot be compared.

Figure 2:
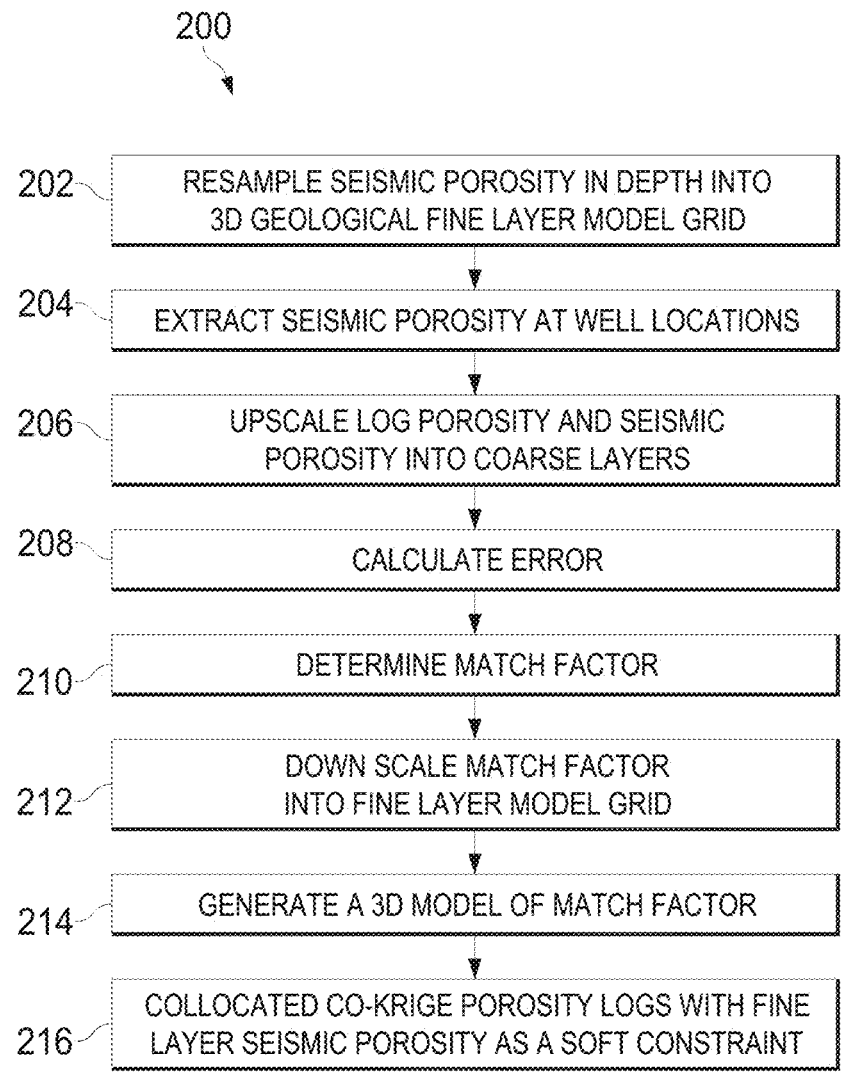
FIG. 2 is a flowchart illustrating an example method for propagate correlation weights in the model space based on a spatial and temporal match between seismic and log data and to cokrige the logs with seismic soft constraints with a three dimensional (3D) weight.

In order to mitigate these drawbacks, the describe system may implement a process, such as the example process 200 depicted in FIG. 2. The example process 200 can be employed by the described system and according implementations of the present disclosure. For clarity of presentation, the description that follows generally describes process 200 in the context of FIGS. 1A and 3-8. However, it will be understood that process 200 may be performed, for example, by any other suitable system, environment, software, and hardware, or a combination of systems, environments, software, and hardware. In some implementations, various steps of the depicted process 200 can be run in parallel, in combination, in loops, or in any order.

The example process 200 may be employed by the described system to propagate correlation weights in the model space based on a spatial and temporal match between seismic and log data and to cokrige the logs with seismic soft constraints with a three dimensional (3D) weight. Kriging and cokriging are employed within the example process 200 as it provides a linear unbiased prediction of intermediate values. Kriging is done with one variable, and cokriging is employed when number of variables is more than one. In some implementations, Kriging is employed to predict the value of a function at a given point by computing a weighted average of the known values of the function in the neighborhood of the point. Such a method (Kriging) is mathematically closely related to regression analysis/modeling as both theories derive a best linear unbiased estimator, based on assumptions on covariances, make use of Gauss-Markov theorem to prove independence of the estimate and error, and make use of a similar formulae. Even so, they are useful in different frameworks. For example, Kriging may be employed for the estimation of a single realization of a random field, while a regression model may be based on multiple observations of a multivariate data set.

At 202, the seismic porosity in depth is resampled into a 3D geological fine layer model grid. Seismic porosity includes a sample interval, which can be different from the sampling interval of the 3D geological fine layer model. Therefore, the seismic property can be resampled to fit into the model grid. In some implementations, the seismic porosity is calculated from inversion of seismic data. The inversion can be a post stack, pre stack, or stochastic inversion. Seismic porosity can be estimated by using a transform from a regression analysis using, for example, a multi-attribute transform or a neural network. From 202, the process 200 proceeds to 204.

At 204, the seismic porosity is extracted at well locations, where well log data exists, in order to compare the original well log with the seismic data. For example, once seismic data is loaded into the 3D geological fine layer model grid, it can be extracted as a well log at any location within the model. But we need to extract it at well locations. From 204, the process 200 proceeds to 206.

At 206, log porosity, which includes the porosity values from well logs, and the seismic porosity are upscaled into coarse layers where a visual comparison can be made. For example, well logs and extracted seismic data at well locations can be displayed to determine several intervals within which they can be compared. These intervals or layers are normally much thicker than the model layers and thus are referenced to as coarse layers. In some implementation, this step is performed for all the wells in the model and the coarse layers are the same for all of the wells. From 206, the process 200 proceeds to 208.

At 208, the error is calculated as the log porosity (L) minus the seismic porosity (S). For example, upscaling may include a process by which a property measured in fine scale is averaged or resampled in a coarser scale. Similarly, downscaling may include a process where a measurement done in a large scale is re-measured in fine scale. Here the fine scale well logs are upscaled and seismic property extracted as well logs are downscaled to the same coarse grid. The error includes the difference in values of the property at each grid. From 208, the process 200 proceeds to 210.

At 210, a match factor is determined. For example, the measured error at each layer of the coarse grid is signed (e.g., positive or negative values). The absolute error is calculated as the absolute value of the error. The absolute value of the measured error provides the relative error at each layer at a well location. The absolute error may then be normalized by, for example, dividing the absolute error by a maximum absolute value error (e.g., the largest error at the well location). Thus, at each well location, relative errors ranging from 0 to 1 are determined. This is the mismatch at each layer at the well location, so one minus the mismatch (the normalized absolute error) provides a relative match between the well log and seismic data at each coarse grid. This relative match may be referred to as the match factor. In some implementations, the match factor value depends on the absolute error between seismic property and well data. A check factor may be employed to determine how much the seismic property differs from the well data as a percentage of well data. For example, an arbitrary limit of percentage value (e.g., 75 percent) may be set, which means that if the seismic property differs by the percentage value (e.g., 75 percent) of the log data, then the seismic data can be rejected by setting the match factor as "0". As such, this check factor reassures that only reliable prediction from seismic data is used and wide fluctuations are rejected. From 210, the process 200 proceeds to 212.

At 212, match factor is downscaled into fine layer model grid as the match factor is a well log sampled in a coarse grid. Such a match factor log may describe the relation between the log and seismic property at the well location. A 3D geological model (e.g., a 3D property cube) with these logs may also be generated, which describes the weight of the seismic at individual cell as a 3D property. This 3D property cube may be employed as weight in collocated cokriging the well logs with seismic property as a soft constraint to create the final geologic model. From 216, the process 200 ends.

Figure 3A:
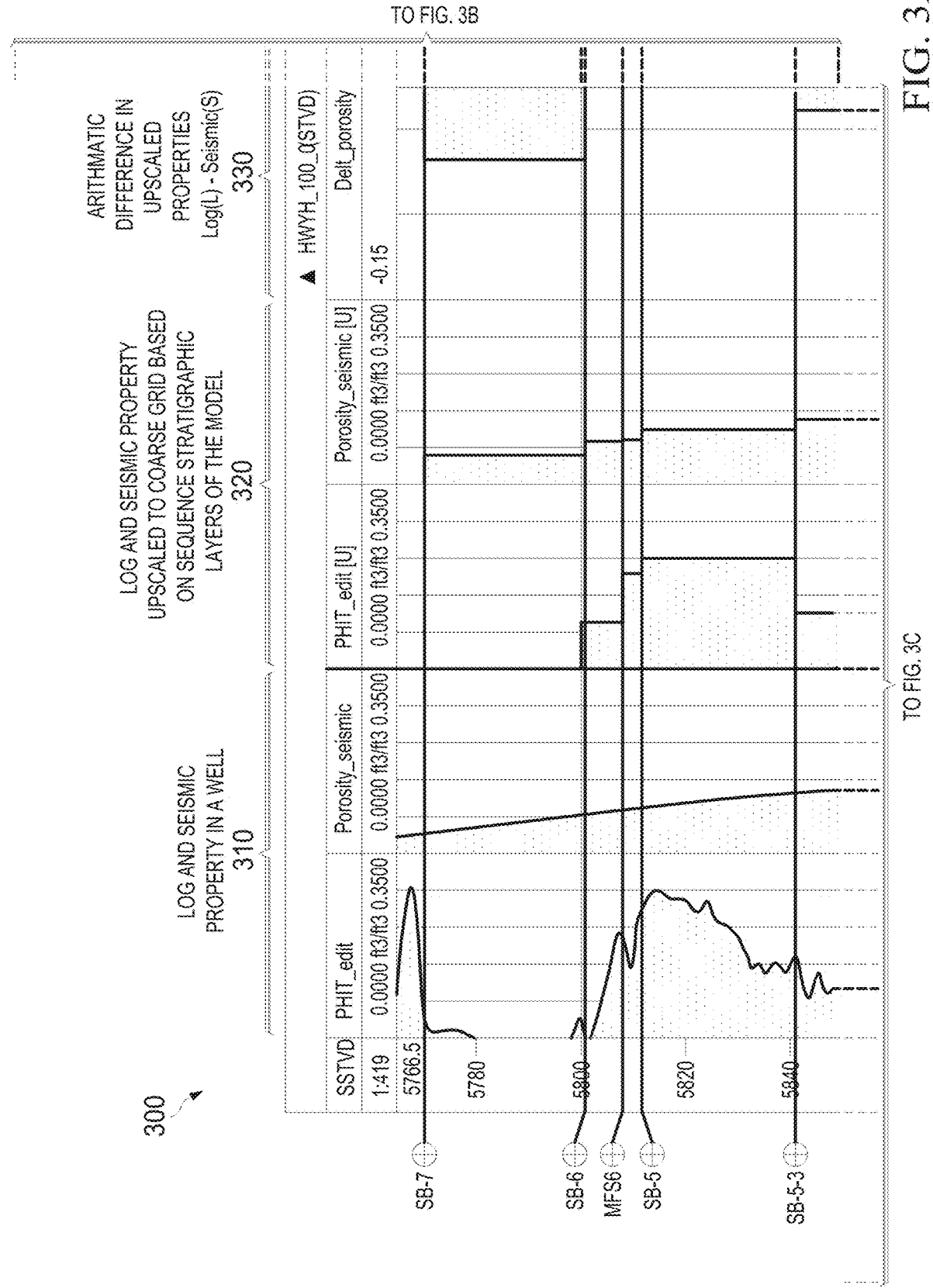
Figure 3B:
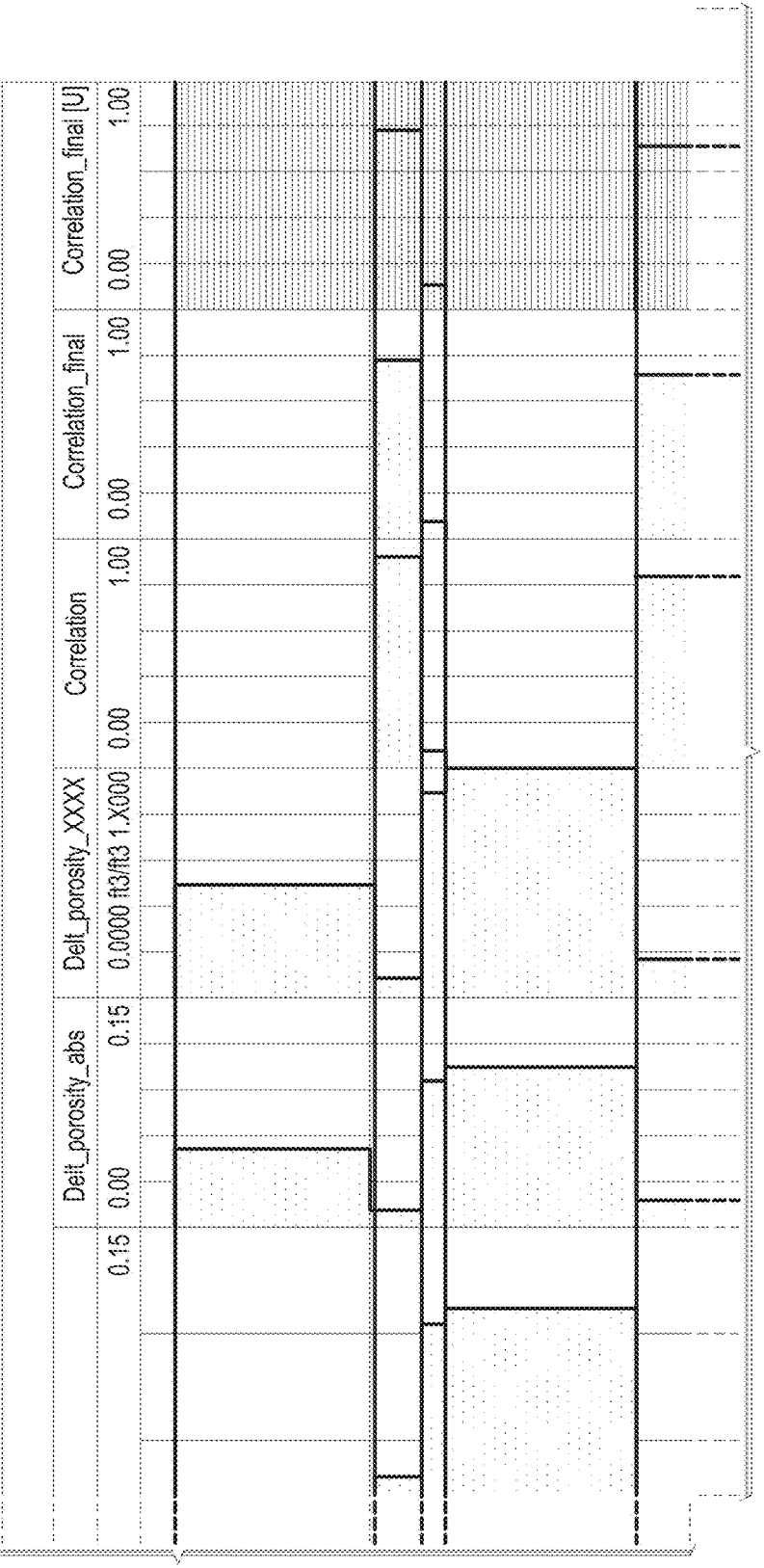

FIG. 3 illustrates an example of a complete sequential buildup of a workflow. At 310, Log and seismic property in a well are determined. At 320, log and seismic property are upscaled to coarse grid based on sequence stratigraphic layers of the model. Next, at 330, the arithmatic difference in upscaled properties Log(L)−Seismic(S) are determined. At 340, the absolute value of the difference ABS(L−S) is calculated. At 350, the difference in each individual logs is normalized so that each log has a minimum '0' and maximum '1'. This is the mismatch log at the well can be denoted as NORM(ABS(L−S)). At 360, a correlation log is determined and equal to 1−mismatch log. If ABS(L−S)/L is greater than 0.75, then the correlation log value for the cell is set to "0". In some implementations, the Correlation Log is further scaled to the correlation value observed in seismic scale. At 370, the Correlation Log is down-scaled to model grid. The correlation established in the individual sequence boundary is assumed valid for all the fine grids contained within the same sequence boundary.

Figure 4A:
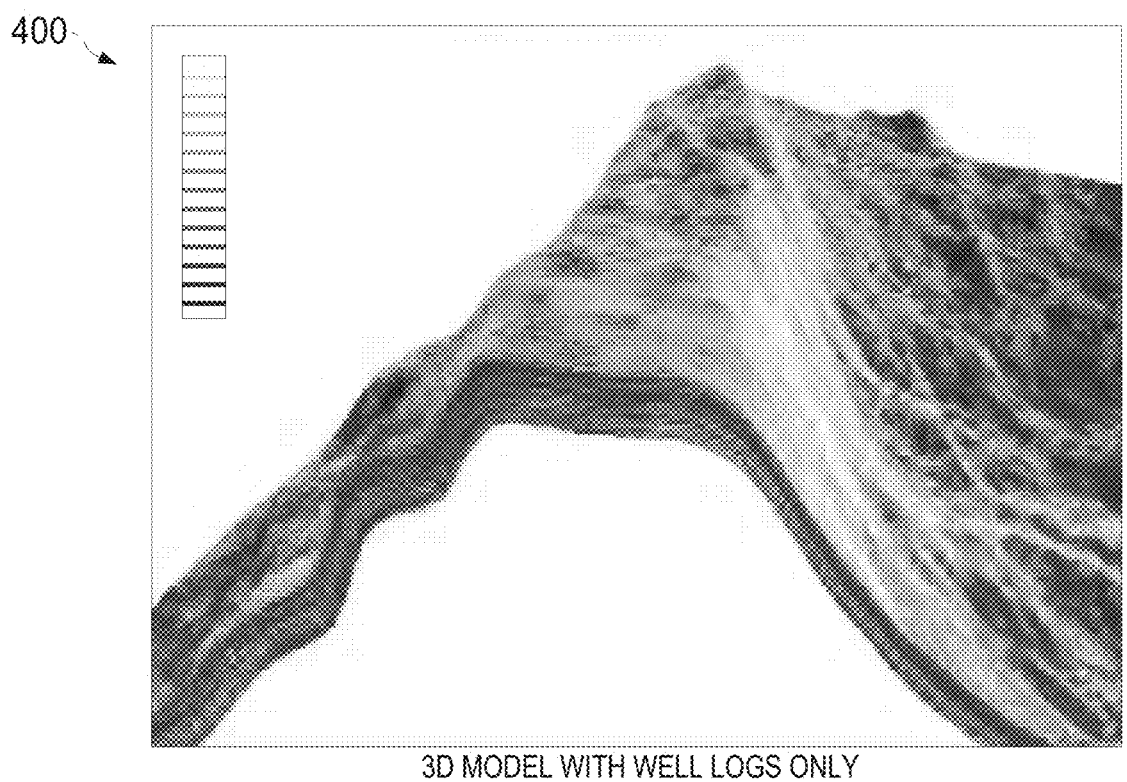
FIGS. 4A-D are schematic diagrams 400-460 respectively.
Figure 4B:
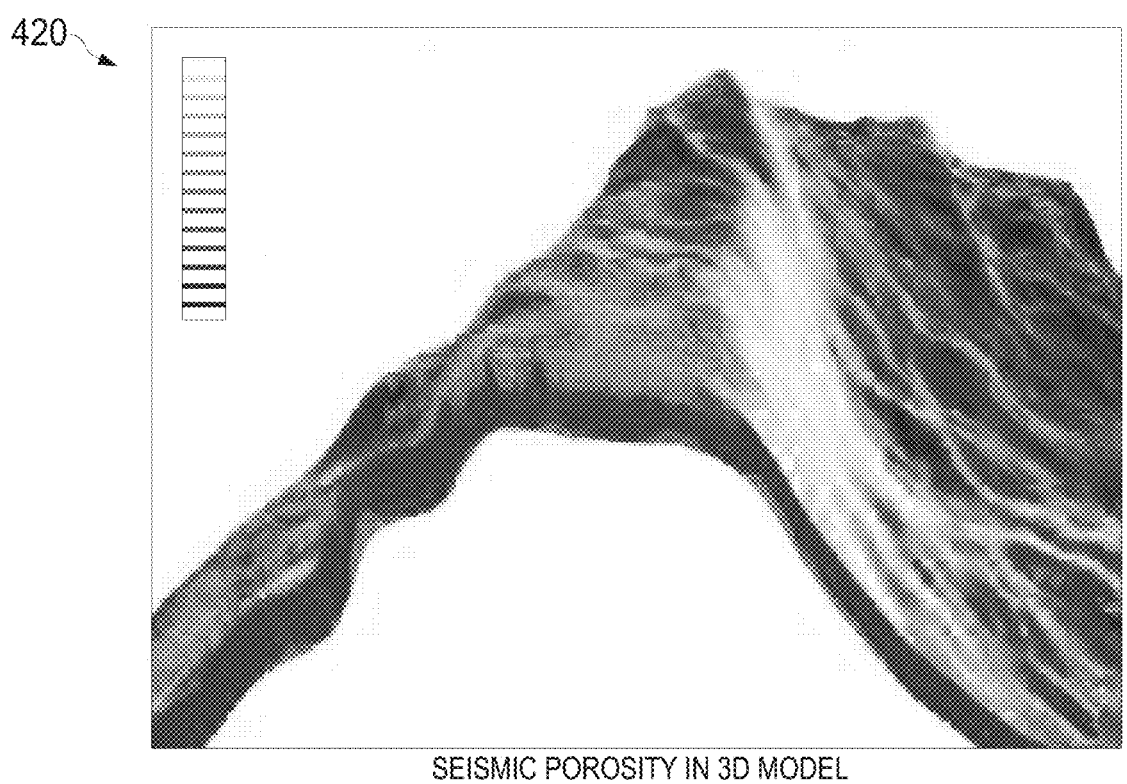
Figure 4C:
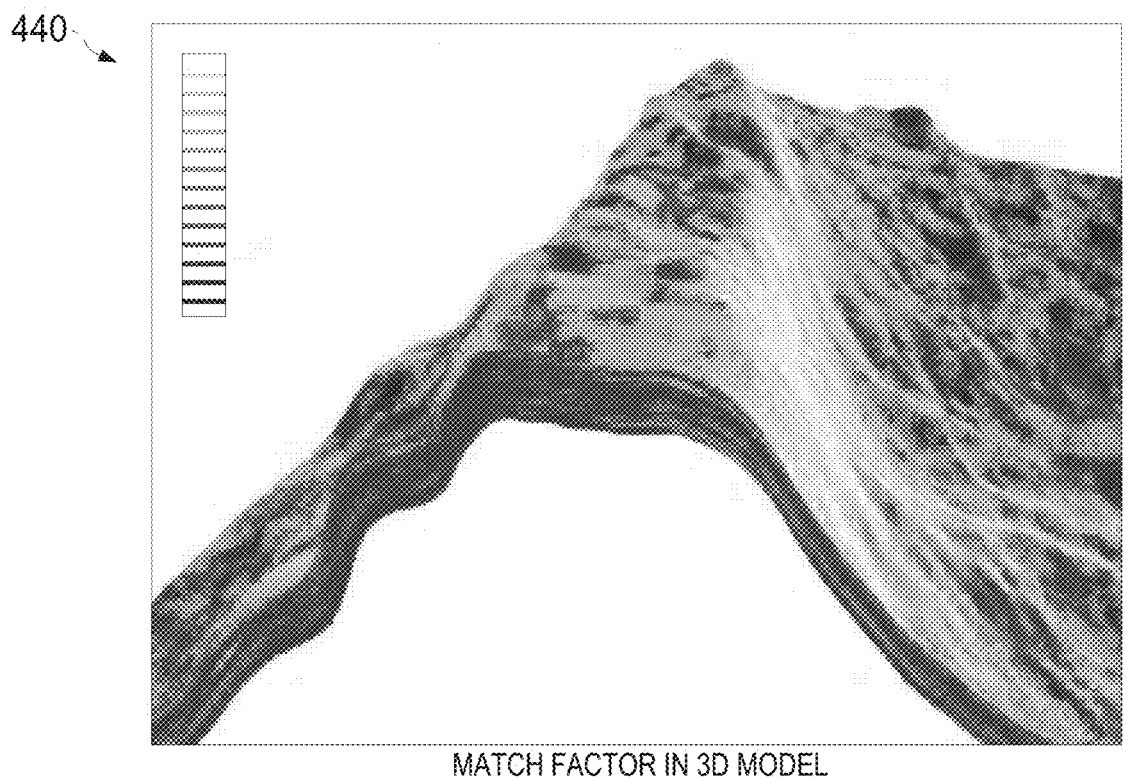
Figure 4D:
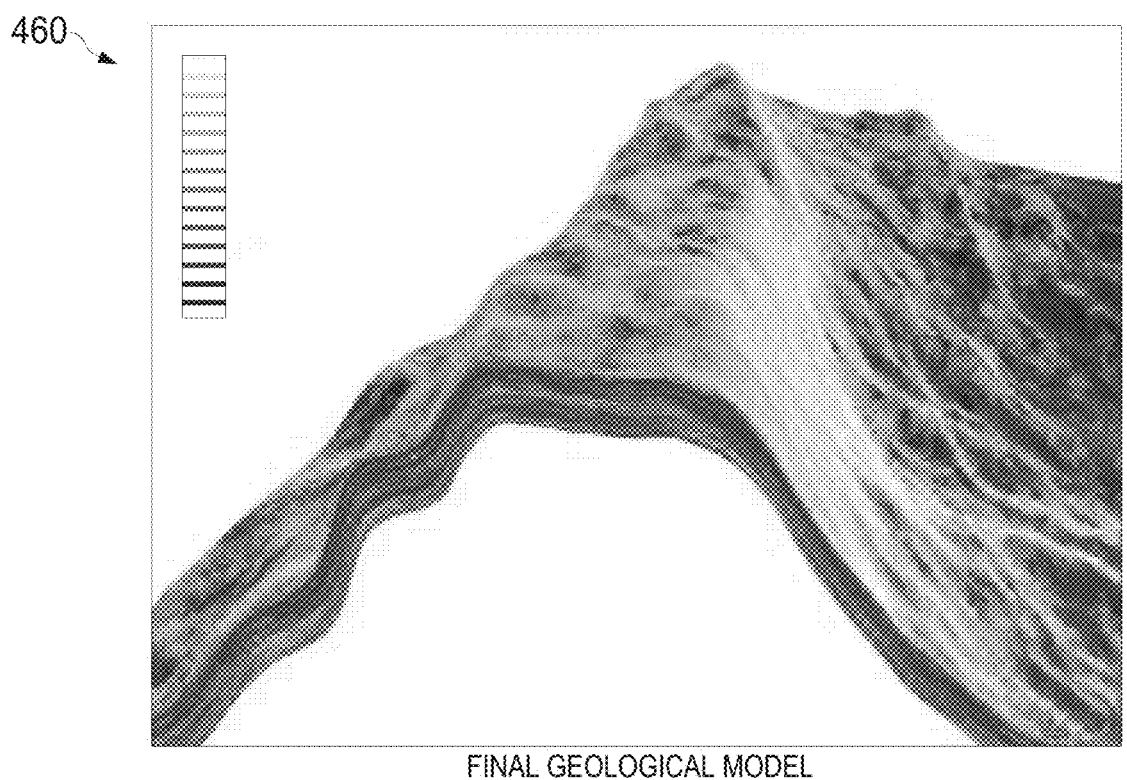

FIG. 4A-4D depict schematic diagrams 400-460 respectively. FIG. 4A depicts a schematic diagram 400 of a 3D model of well log (hard) data. FIG. 4B depicts a schematic diagram 420 of seismic property (soft constraint). FIG. 4C depicts a schematic diagram 440 of a 3D correlation model as weight. FIG. 4D depicts a schematic diagram 460 final 3D geological model. In some implementations, a 3D model, such as depicted in FIG. 4A, can be collocated co-kriged with seismic property (soft data), such as depicted in FIG. 4B, with a 3D correlation model, such as depicted in FIG. 3C, to produce a final 3D geological model, such as depicted in FIG. 4D.

Figure 5A:
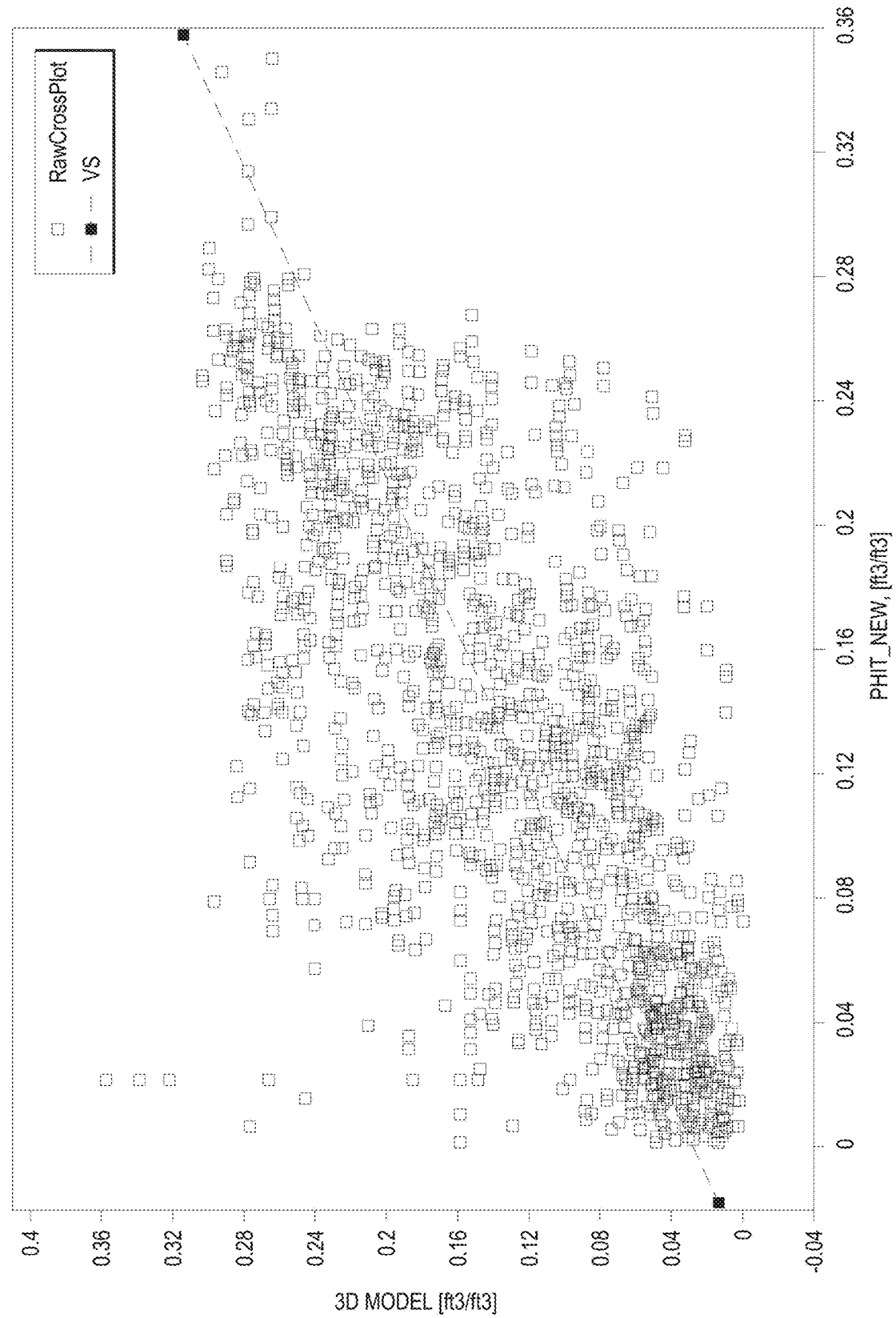
FIGS. 5A-B depict results of final model.

FIGS. 5A-B and 6A-B depicts results of final model generated according to implementations of the present disclosure. FIG. 5A depicts an example cross plot 500 of blind well correlation from a well only model with a correlation of 76 percent. The depicted graph shows the correlation of well log porosity and predicted porosity from a model that is created at five blind well locations.

Figure 5B:
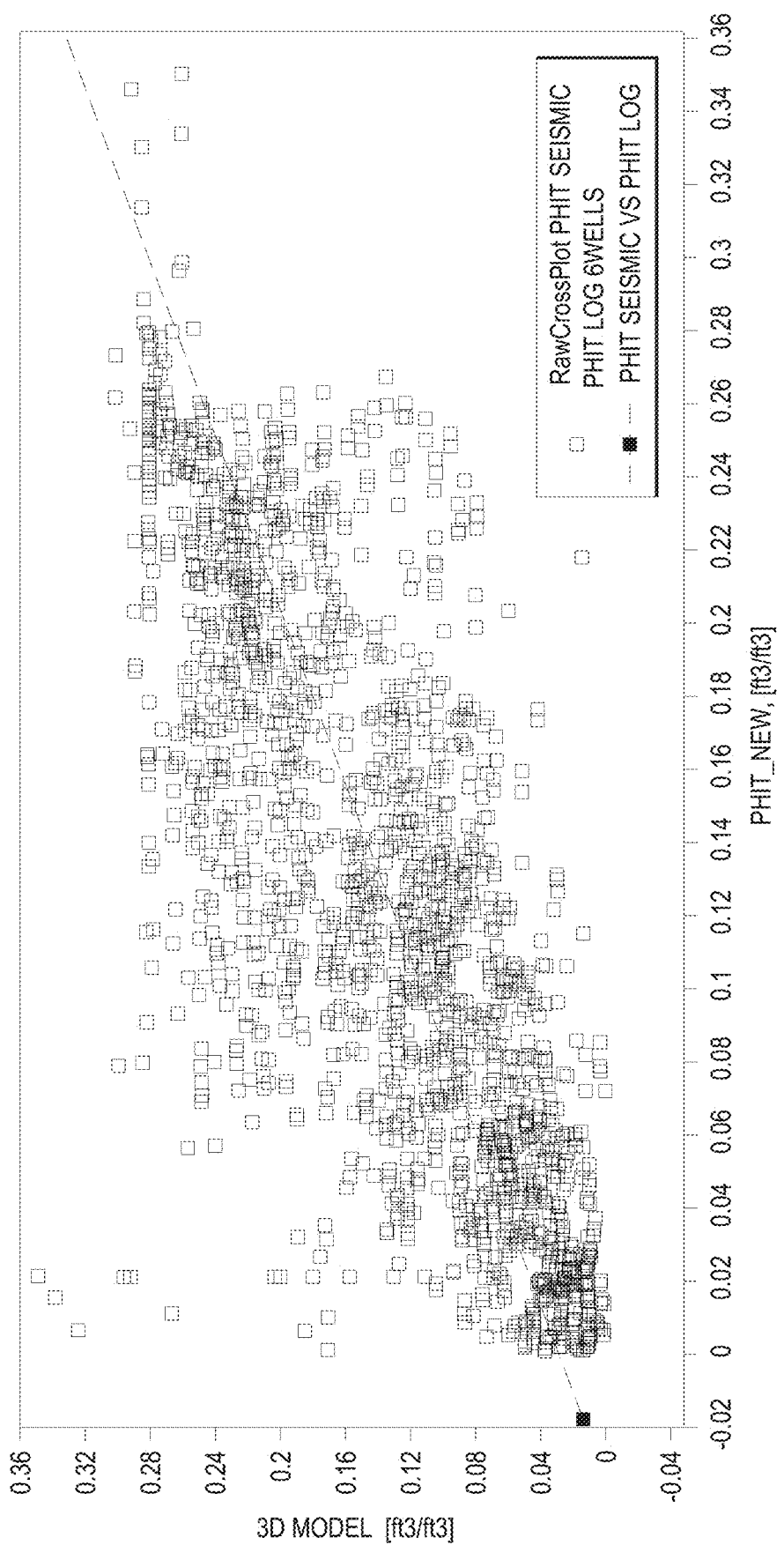

FIG. 5B depicts an example cross plot 520 of a blind well correlation from well plus seismic model with a correlation of 80 percent. FIG. 5B shows the same cross plot from the same five blind well locations as depicted in the example cross plot 500 of FIG. 5A. The example 520 cross plot depicts where the 3D geological model was built with the proposed workflow. The cross correlation value, which is a measure of predictability, shows an improvement from 76% to 80%.

Figure 6A:
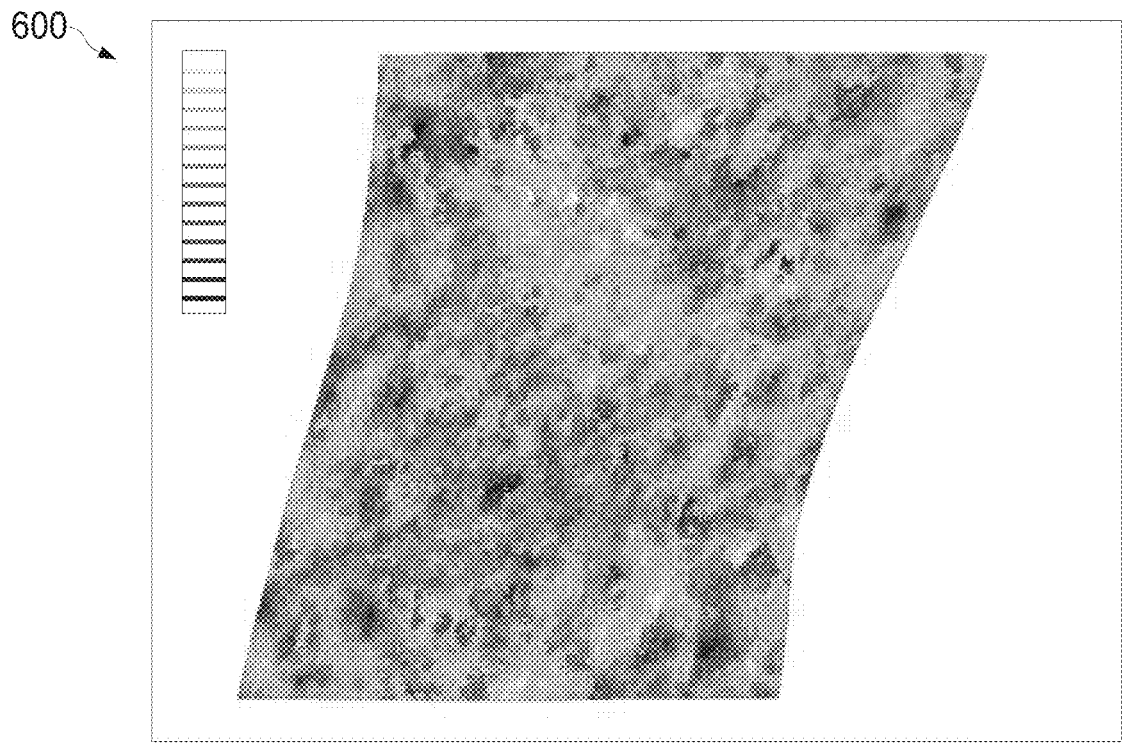
FIGS. 6A-B depicts examples of layer of porosity models 600 and 650 respectively within a sequence boundary.
Figure 6B:
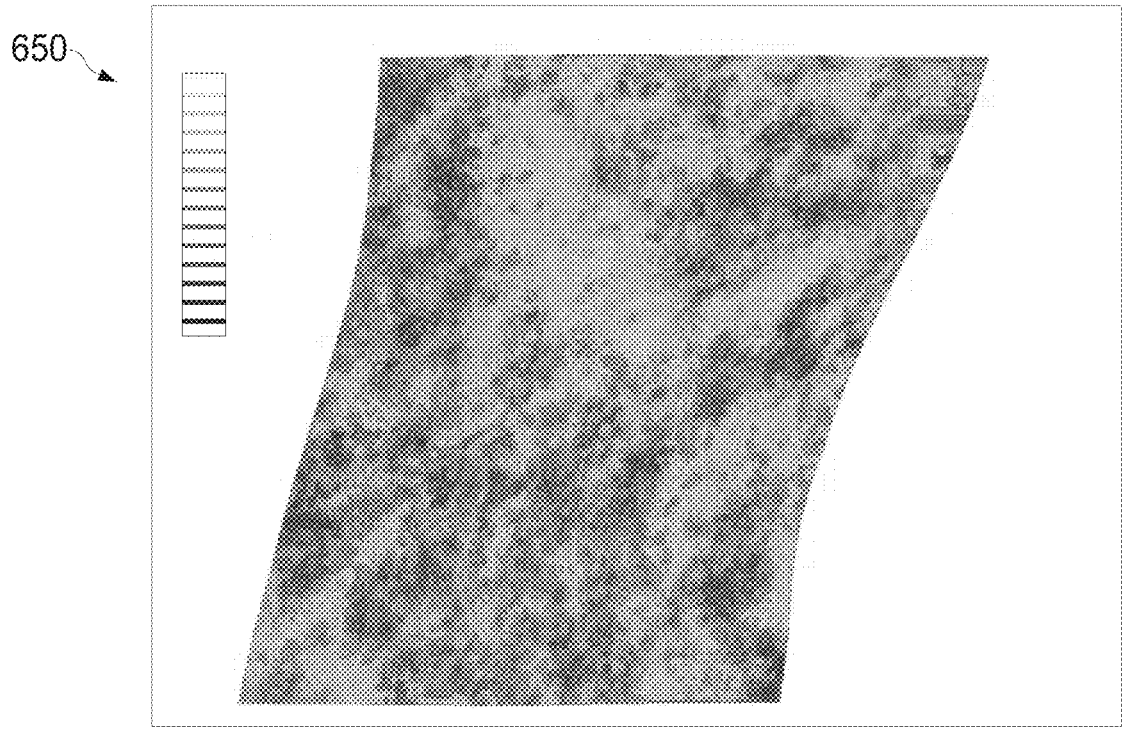

FIGS. 6A and 6B depicts examples of layer of porosity models 600 and 650 respectively within a sequence boundary. FIG. 6A depicts the well data only. FIG. 6B depicts the well and seismic data. FIG. 6A shows porosity of a layer from a model that has been built traditionally where as 6B shows the same layer from the model built through the described system and according to implementations of the present disclosure.

Figure 7:
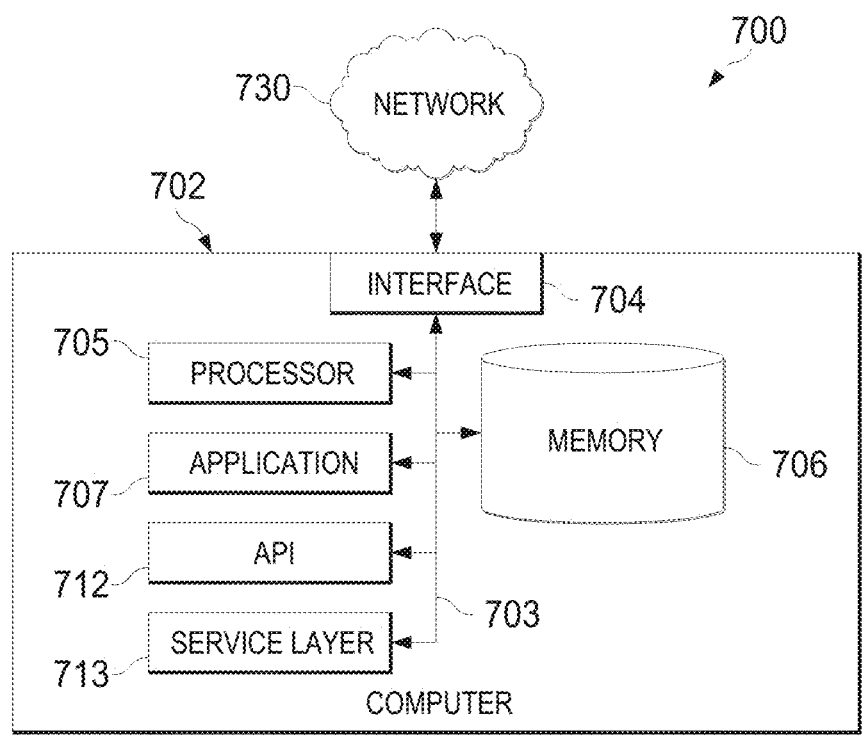
FIG. 7 depicts a block diagram of an exemplary computer system used to provide computational functionalities associated with described algorithms, methods, functions, processes, flows, and procedures as described in the instant disclosure, according to an implementation.

FIG. 7 depicts a block diagram of an exemplary computer system 700 used to provide computational functionalities associated with described algorithms, methods, functions, processes, flows, and procedures as described in the instant disclosure, according to an implementation. The illustrated computer 702 is intended to encompass any computing device such as a server, desktop computer, laptop or notebook computer, wireless data port, smart phone, personal data assistant (PDA), tablet computing device, or one or more processors within these devices, including both physical or virtual instances (or both) of the computing device. Additionally, the computer 702 may comprise a computer that includes an input device, such as a keypad, keyboard, touch screen, or other device that can accept user information, and an output device that conveys information associated with the operation of the computer 702, including digital data, visual, or audio information (or a combination of information), or a GUI.

The computer 702 can serve in a role as a client, network component, a server, a database or other persistency, or any other component (or a combination of roles) of a computer system for performing the subject matter described in the instant disclosure. The illustrated computer 702 is communicably coupled with a network 730. In some implementations, one or more components of the computer 702 may be configured to operate within environments, including cloud-computing-based, local, global, or a combination of environments.

At a high level, the computer 702 is an electronic computing device operable to receive, transmit, process, store, or manage data and information associated with the described subject matter. According to some implementations, the computer 702 may also include or be communicably coupled with an application server, e-mail server, web server, caching server, streaming data server, business intelligence (BI) server, or other server (or a combination of servers).

The computer 702 can receive requests over network 730 from a client application (for example, executing on another computer 702) and responding to the received requests by processing the said requests in a software application. In addition, requests may also be sent to the computer 702 from internal users (for example, from a command console or by other access method), external or third parties, other automated applications, as well as any other entities, individuals, systems, or computers.

Each of the components of the computer 702 can communicate using a system bus 703. In some implementations, any or all of the components of the computer 702, both hardware or software (or a combination of hardware and software), may interface with each other or the interface 704 (or a combination of both) over the system bus 703 using an application programming interface (API) 712 or a service layer 713 (or a combination of the API 712 and service layer 713). The API 712 may include specifications for routines, data structures, and object classes. The API 712 may be either computer-language independent or dependent and refer to a complete interface, a single function, or even a set of APIs. The service layer 713 provides software services to the computer 702 or other components (whether or not illustrated) that are communicably coupled to the computer 702. The functionality of the computer 702 may be accessible for all service consumers using this service layer. Software services, such as those provided by the service layer 713, provide reusable, defined business functionalities through a defined interface. For example, the interface may be software written in JAVA, C++, or other suitable language providing data in extensible markup language (XML) format or other suitable format. While illustrated as an integrated component of the computer 702, alternative implementations may illustrate the API 712 or the service layer 713 as stand-alone components in relation to other components of the computer 702 or other components (whether or not illustrated) that are communicably coupled to the computer 702. Moreover, any or all parts of the API 712 or the service layer 713 may be implemented as child or sub-modules of another software module, enterprise application, or hardware module without departing from the scope of this disclosure.

The computer 702 includes an interface 704. Although illustrated as a single interface 704, two or more interfaces 704 may be used according to particular needs, desires, or particular implementations of the computer 702. The interface 704 is used by the computer 702 for communicating with other systems in a distributed environment that are connected to the network 730 (whether illustrated or not). Generally, the interface 704 comprises logic encoded in software or hardware (or a combination of software and hardware) and operable to communicate with the network 730. More specifically, the interface 704 may comprise software supporting one or more communication protocols associated with communications such that the network 730 or interface's hardware is operable to communicate physical signals within and outside of the illustrated computer 702.

The computer 702 includes a processor 705. Although illustrated as a single processor 705, two or more processors may be used according to particular needs, desires, or particular implementations of the computer 702. Generally, the processor 705 executes instructions and manipulates data to perform the operations of the computer 702 and any algorithms, methods, functions, processes, flows, and procedures as described in the instant disclosure.

The computer 702 also includes a memory 706 that holds data for the computer 702 or other components (or a combination of both) that can be connected to the network 730 (whether illustrated or not). For example, memory 706 can be a database storing data consistent with this disclosure. Although illustrated as a single memory 706, two or more memories may be used according to particular needs, desires, or particular implementations of the computer 702 and the described functionality. While memory 706 is illustrated as an integral component of the computer 702, in alternative implementations, memory 706 can be external to the computer 702.

The application 707 is an algorithmic software engine providing functionality according to particular needs, desires, or particular implementations of the computer 702, particularly with respect to functionality described in this disclosure. For example, application 707 can serve as one or more components, modules, or applications. Further, although illustrated as a single application 707, the application 707 may be implemented as multiple applications 707 on the computer 702. In addition, although illustrated as integral to the computer 702, in alternative implementations, the application 707 can be external to the computer 702.

There may be any number of computers 702 associated with, or external to, a computer system containing computer 702, each computer 702 communicating over network 730. Further, the term "client," "user," and other terminology may be used interchangeably as without departing from the scope of this disclosure. Moreover, this disclosure contemplates that many users may use one computer 702, or that one user may use multiple computers 702.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data. Such devices can include, for example, a programmable processor, a computer, or multiple processors or computers. The apparatus can also be or further include special purpose logic circuitry, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, or libraries. Conversely, the features and functionality of various components can be combined into single components.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and compact disc read-only memory (CD-ROM), Digital Versatile Disc (DVD)+/−R, DVD-RAM, and DVD-ROM disks. The memory may store various objects or data, including caches, classes, frameworks, applications, backup data, jobs, web pages, web page templates, database tables, repositories storing dynamic information, and any other information including any parameters, variables, algorithms, instructions, rules, constraints, or references thereto. Additionally, the memory may include any other data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), Light Emitting Diode (LED), or plasma monitor, for displaying information to the user and a keyboard and a pointing device, for example, a mouse, trackball, or trackpad, by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term graphical user interface (GUI) may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 702.11 a/b/g/n or 702.20 (or a combination of 702.11x and 702.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an API or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of the described system or on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described earlier as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed.

Moreover, the separation or integration of various system modules and components in the implementations described earlier should not be understood as requiring such separation or integration in all implementations, and it should be understood that the described program components and systems can generally be integrated together in a single software product or packaged into multiple software products.

Accordingly, the earlier description of example implementations does not define or constrain this disclosure. Other changes, substitutions, and alterations are also possible without departing from the spirit and scope of this disclosure.

Furthermore, any claimed implementation described later is considered to be applicable to at least a computer-implemented method, a non-transitory, computer-readable medium storing computer-readable instructions to perform the computer-implemented method, and a computer system comprising a computer memory interoperably coupled with a hardware processor configured to perform the computer-implemented method or the instructions stored on the non-transitory, computer-readable medium.

What is claimed is:

1. A computer-implemented method for generating a geo-cellular model with improved reliability executed by one or more processors, the method comprising:
   receiving a seismic dataset of a surveyed subsurface, the seismic dataset comprising seismic porosities in depth of the surveyed subsurface;
   resampling seismic porosities into a three dimensional (3D) geological fine layer model grid, wherein the 3D geological fine layer model grid is a static model of a reservoir;
   extracting seismic porosities at well locations using the 3D geological fine layer model grid;
   upscaling log porosities and the seismic porosities into coarse layers at the well locations, wherein the coarse layers are identical for all the well locations;
   determining match factors based on differences between the upscaled log porosities and the downscaled seismic porosities; and
   collocating co-krig the log porosities with the 3D geological fine layer model grid using the match factors as a seismic property to produce a final 3D model;
   extracting hydrocarbons according to the final 3D model.

2. The computer-implemented method of claim 1, further comprising evaluating a productivity of the surveyed subsurface according to the final 3D model.

3. The computer-implemented method of claim 1, further comprising calculating errors based on differences between the upscaled log porosities and the downscaled seismic porosities.

4. The computer-implemented method of claim 3, further comprising:
   for each of the errors, calculating an absolute error; and
   for each of the absolute error, dividing that absolute error by a maximum absolute error to produce a normalized absolute error, wherein each of the match factors equal to one minus the normalized absolute error.

5. The computer-implemented method of claim 4, further comprising, for each of the match factors, setting that match factor to zero when that absolute error divided by the upscaled log value is greater than 0.75.

6. The computer-implemented method of claim 5, further comprising:
   downscaling the match factors into a fine layer model grid; and
   generating a 3D correlation model based on the downscaled match factors, wherein the 3D correlation model is used as the seismic property to produce the final 3D model.

7. One or more non-transitory computer-readable storage media coupled to one or more processors and having instructions stored thereon which, when executed by the one or more processors, cause the one or more processors to:
   receive a seismic dataset of a surveyed subsurface, the seismic dataset comprising seismic porosities in depth of the surveyed subsurface;
   resample seismic porosities into a three dimensional (3D) geological fine layer model grid, wherein the 3D geological fine layer model grid is a static model of a reservoir;
   extract seismic porosities at well locations using the 3D geological fine layer model grid;
   upscale log porosities and the seismic porosities into coarse layers at the well locations, wherein the coarse layers are identical for all the well locations;
   determine match factors based on differences between the upscaled log porosities and the downscaled seismic porosities; and
   collocate co-krig the log porosities with the 3D geological fine layer model grid using the match factors as a seismic property to produce a final 3D model; and
   extract hydrocarbons according to the final 3D model.

8. The computer-readable storage media of claim 7, further comprising evaluating a productivity of the surveyed subsurface according to the final 3D model.

9. The computer-readable storage media of claim 7, further comprising calculating errors based on differences between the upscaled log porosities and the downscaled seismic porosities.

10. The computer-readable storage media of claim 9, further comprising:
    for each of the errors, calculating an absolute error; and
    for each of the absolute error, dividing that absolute error by a maximum absolute error to produce a normalized absolute error, wherein each of the match factors equal to one minus the normalized absolute error.

11. The computer-readable storage media of claim 10, further comprising, for each of the match factors, setting that match factor to zero when that absolute error divided by the upscaled log value is greater than 0.75.

12. The computer-readable storage media of claim 11, further comprising:
    downscaling the match factors into a fine layer model grid; and
    generating a 3D correlation model based on the downscaled match factors, wherein the 3D correlation model is used as the seismic property to produce the final 3D model.

13. A system, comprising:
    one or more processors; and
    a computer-readable storage device coupled to the one or more processors and having instructions stored thereon which, when executed by the one or more processors, cause the one or more processors to:
    receive a seismic dataset of a surveyed subsurface, the seismic dataset comprising seismic porosities in depth of the surveyed subsurface;
    resample seismic porosities into a three dimensional (3D) geological fine layer model grid, wherein the 3D geological fine layer model grid is a static model of a reservoir;
    extract seismic porosities at well locations using the 3D geological fine layer model grid;
    upscale log porosities and the seismic porosities into coarse layers at the well locations, wherein the coarse layers are identical for all the well locations;
    determine match factors based on differences between the upscaled log porosities and the downscaled seismic porosities; and
    collocate co-krig the log porosities with the 3D geological fine layer model grid using the match factors as a seismic property to produce a final 3D model;
    extract hydrocarbons according to the final 3D model.

14. The system of claim 13, further comprising evaluating a productivity of the surveyed subsurface according to the final 3D model.

15. The system of claim 13, further comprising calculating errors based on differences between the upscaled log porosities and the downscaled seismic porosities.

16. The system of claim 15, further comprising:
    for each of the errors, calculating an absolute error; and for each of the absolute error, dividing that absolute error by a maximum absolute error to produce a normalized absolute error, wherein each of the match factors equal to one minus the normalized absolute error.

17. The system of claim 16, further comprising, for each of the match factors, setting that match factor to zero when that absolute error divided by the upscaled log value is greater than 0.75.

18. The system of claim 17, further comprising: downscaling the match factors into a fine layer model grid; and generating a 3D correlation model based on the downscaled match factors, wherein the 3D correlation model is used as the seismic property to produce the final 3D model.

* * * * *